United States Patent [19]

Brown

[11] Patent Number: 4,835,377
[45] Date of Patent: May 30, 1989

[54] PROGRAMMER FOR IDENTIFICATION SYSTEM

[76] Inventor: Richard R. Brown, 514 Paige Loop, Los Alamos, N. Mex. 87544

[21] Appl. No.: 61,167

[22] Filed: Jun. 10, 1987

[51] Int. Cl.$^4$ ............................................. G06K 19/06
[52] U.S. Cl. ...................................... 235/492; 235/376
[58] Field of Search ................................ 235/492, 376

[56] References Cited

U.S. PATENT DOCUMENTS

4,654,512 3/1987 Gardosi ............................... 235/492

*Primary Examiner*—Harold I. Pitts

[57] ABSTRACT

A tag has a memory programmable to store alphanumeric indications in a pattern identifying an object associated with the tag. The stored indications are convertible to signals transmitted to a displaced reader in an individual pattern at first and second frequencies to identify the objects. The memory may be programmed, during the production of a first logic level in a signal on a program pin, (a) by the operation of keys on a keyboard in a programmer housing, each key representing an individual alphanumeric character, or (b) from an external source such as a typewriter keyboard used in conjunction with the programmer. The signal on the program pin has a second logic level to provide for bulk erasing all particular memory positions. A configuration signal has a first logic level providing for the alphanumeric coding of the memory and a second logic level providing for the selection, at particular memory positions, of individual capacitors to generate signals at the first and second frequencies. When the programming signal has the second logic level and the configuration signal has the first logic level, bulk information may be erased from the memory.

30 Claims, 7 Drawing Sheets

| CC2 | CC7 | PROG |
|-----|-----|------|
| Lo  | Lo  | 0.0V |
| Lo  | Hi  | 5.0V |
| Hi  | Lo  | 0.0V |
| Hi  | Hi  | 17.0V |

FIG. 12 WRITE/ERASE MODE

FIG. 13 CONFIGURATION

FIG. 14 BULK WRITE / BULK ERASE

PROGRAMMER FOR IDENTIFICATION SYSTEM

This invention relates to apparatus for programming a tag which identifies an object by transmitting to a reader a plurality of signals in a sequence individual to the object. More particularly, the invention relates to apparatus for programming a programmable memory of a tag so that the memory will store an individual code of alphanumeric characters which can be converted to an individual sequence of signals at first and second frequencies when the tag is interrogated by the reader.

As commerce becomes increasingly complex, the need to identify articles used in commerce increases. For example, as ships move into and out of a port, the ships have to be identified. Furthermore, each of such ships holds a large number of containers which are being transported by the ship from one destination to another. These containers have to be identified to determine the containers which have to be unloaded at the port.

As will be seen, a considerable delay will be experienced by the ship before it is able to depart from a port if each of the containers has to be physically handled in order to identify the containers which have to be unloaded at the port. It would be preferable if the containers could be interrogated from the shore to identify the cargo being stored in the containers.

Co-pending application Ser. No. 885,248 now U.S. Pat. No. 4,739,328, filed in the U.S. Patent Office by Alfred R. Koelle and Jeremy A. Landt on July 14, 1986, for a "System for Identifying Particular Objects" and assigned of record to the assignee of record of this application discloses and claims a system which includes a reader and a transponder (or tag) associated with the reader for identifying an object such as a container which is displaced from the reader by a distance as great as approximately thirty (30) feet. The transponder (or tag) is attached to the object to be identified.

A code of a unique combination of alphanumeric characters is stored in a programmable memory in the transponder. When the transponder (or tag) is interrogated by a signal from the reader, the transponder converts the stored alphanumeric code into a sequential pattern of signals at first and second frequencies in representation of the unique combination of alphanumeric characters stored in the programmable memory of the transponder. The reader than decodes the sequential pattern of signals transmitted at the first and second frequencies to identify the object.

As will be appreciated, apparatus has to be provided to program the unique code of alphanumeric characters into the memory in the transponder (or tag). Preferably, such programming should be capable of being provided by the operation of a keyboard on such programming apparatus or by signals from an external source such as a typewriter keyboard used in conjunction with the programmer. Furthermore, the signals are preferably transmitted from the transponder on the tag to the reader precisely at the first and second frequencies to identify the object. Accordingly, the programming apparatus should preferably be able to adjust components in the transponder to insure that the signals will be transmitted by the transponder precisely at the first and second frequencies. Apparatus is not presently available for programming a memory in a tag in this manner in spite of the fact that there is a great and continuing need for such apparatus.

This invention provides apparatus for programming a transponder (or tag) in the manner discussed in the previous paragraph. The programming apparatus records alphanumeric characters in a programmable memory on a tag in a unique code identifying an object with which the tag is associated. The programming apparatus also selects individual ones of a plurality of capacitors to be connected in circuitry on the tag so that, when interrogated by a reader, the tag will send signals precisely at first and second frequencies in an individual and sequential pattern identifying the object with which the tag is associated.

The programming apparatus of this invention also performs other functions in addition to those discussed above. These include bulk erasure of information from the memory. The programmer further provides for a substitution, at selected positions in the memory, of new alphanumeric information for information previously recorded at such positions in the memory. The programming apparatus additionally provides a display in the programmer of the alphanumeric information recorded by the programmer in the memory.

In one embodiment of the invention, a tag has a memory programmable to store alphanumeric indications in an individual pattern identifying an object associated with the tag. The stored indications are convertible to signals transmitted to a displaced reader in an individual pattern at first and second frequencies to identify the object.

The memory on the tag may be programmed, during the production of a first logic level in a signal on a program pin, by the operation of keys on a keyboard in a programmer housing, each key representing an individual alphanumeric character, or may be programmed from an external source such as a typewriter keyboard used in conjunction with the programmer. The signal on the program pin has a first logic level to provide for the selection, at particular positions in the memory, of individual capacitors to insure the generation of the signals by the tag at the first and second frequencies.

A configuration signal has a first logic level providing for the coding of the alphanumeric indications in the memory and a second logic level providing for bulk erasing all particular memory positions. During the production of the first logic levels in the programming and configuration signals, bulk information may be erased from the memory. When an energizing pin in the programmer receives a particular voltage, (1) information is programmed in the memory, (2) the capacitors are selected or (3) bulk erasure of programmed information is provided, the choice being dependent upon the logic levels of the programming and configuration signals.

A detent on the tag has a plurality of connections for introducing the different logic levels to the programming, configuration and energizing pads in the tag. This detent mates with a detent in the programmer housing to provide for the introduction of the programming, configuration and energizing signals to the tag through the pads in the tag detent.

Figure 1:
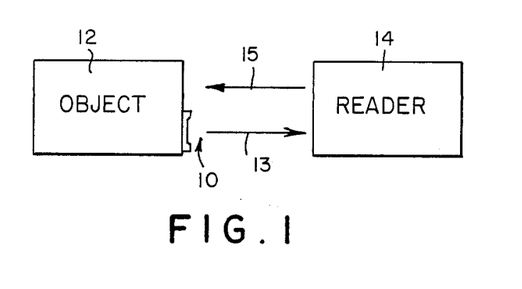
FIG. 1 is a schematic view illustrating a system including a reader and a transponder displaced from the reader and coupled to an object to be identified by the transponder, the system being operative to provide for an interrogation of the transponder by the reader and a subsequent transmission of a unique sequence of signals by the transponder to the reader to identify the object.
Figure 3:
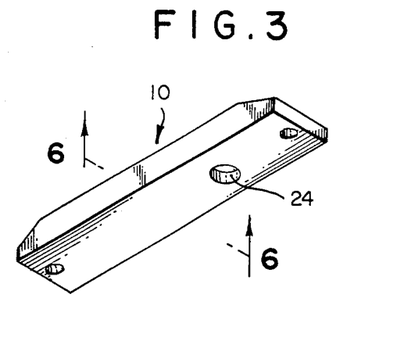
FIG. 3 is a perspective view of the tag, and particularly a detent on the tag for engaging a corresponding detent on the programmer.

In one embodiment of the invention, a tag generally indicated at 10 (FIGS. 1 and 3) is adapted to be disposed on an object 12 with which the tag is associated. For example, the object 12 may be a container holding individual cargo on a ship. The tag 10 may be interrogated by a reader 14 displaced from the object 12, as indicated by an arrow 15 in FIG. 1. When interrogated by the reader (as indicated by arrow 15), the tag 10 may send to the reader 14 a sequence of radio frequency signals at first and second frequencies in an individual pattern identifying the object 12. The sending sequence is indicated by an arrow 13 in FIG. 1. The reader 14 then decodes the sequence of signals at the first and second frequencies to identify the object.

The construction and operation of the systems incorporated in the tag 10 and the reader 14 are fully disclosed and claimed in the following patent applications assigned of record to the assignee of record in this application:

1. Application Ser. No. 885,248 filed on July 14, 1986, in the U.S. Patent Office by Alfred R. Koelle and Jeremy A. Landt for a "System for Identifying Particular Objects".

2. Application Ser. No. 885,250 filed on July 14, 1986, in the U.S. Patent Office by Alfred R. Koelle for a "Transponder Useful in a System for Identifying Objects".

Since each tag 10 has an individual coding to identify the object 12 on which it is disposed, each tag has to be individually programmed. The programming for each tag 10 is preferably identified by a series of alphanumeric characters such as a combination of number and letters. For example, the tag 10 may be identified by an individual sequence of alphanumeric characters such as 1A2B3C coded into a programmable memory 16 (FIG. 10) on the tag. Each character is in turn identified by an individual sequence of binary 1's and binary 0's. For example, the letter "A" may be identified by a binary sequence such as 11010 where the least significant digit is at the right. This sequence is stored in the programmable memory 16 on the tag 10 to identify the letter "A".

As disclosed and claimed in application Ser. No. 885,248, when the alphanumeric code identifying the tag 10 is to be transmitted to the reader 14, a binary bit coding for "1" may be identified by the transmission by the tag 10 to the reader 14 of two (2) signals having a first frequency and then another signal having a second frequency. The first frequency may be twice as great as the second frequency. The first frequency may illustratively be forty kilohertz (40 KHz) and the second frequency may illustratively be twenty kilohertz (20 KHz). Similarly, a binary bit coding for "0" may be identified by the transmission by the tag 10 to the reader 14 of one signal having the second frequency and then two (2) additional signals having the first frequency.

Since each tag 10 has an individual code, the code should be individually programmed into the programmable memory 16 for the tag. Preferably the information programmed into the memory 16 is erasable so that corrections can be made in the information programmed into the memory or so that the information can be updated to program a new code into the memory The programming may be provided at the factory where the tags are manufactured or the programming may be provided by the customer at the customer's facility. The programming of the tag 10 is preferably provided by a programmer generally indicated at 18 in FIG. 2 and constituting one embodiment of the invention.

The programmer 18 (FIG. 2) is provided with a housing 20 having a detent 42 (FIG. 16) for receiving a complementary detent 24 (FIGS. 3-6) on the tag 10. The detent 24 has a plurality of pads 26 which engage pins on the detent 24 when the tag 10 is properly inserted on the housing 20 of the programmer and is pressed downwardly against the housing 20. This activates the pads 26 in the detent 24 so that programming information can be introduced from the programmer 18 through to the tag.

A keyboard generally indicated at 28 (FIG. 2) is disposed on the housing 20. The keyboard 28 is provided with a plurality of keys 30 each controlling an individual operation or providing for the programming of an individual alphanumeric indication in the tag. For example, keys may be provided to activate the tag 10 to receive programmed information or to erase information previously programmed into the memory in the tag. Keys may also be provided to program into the tag information representing individual letters in the alphabet from "A" to "Z" and individual arabic numbers between "0" and "9".

Figure 2:
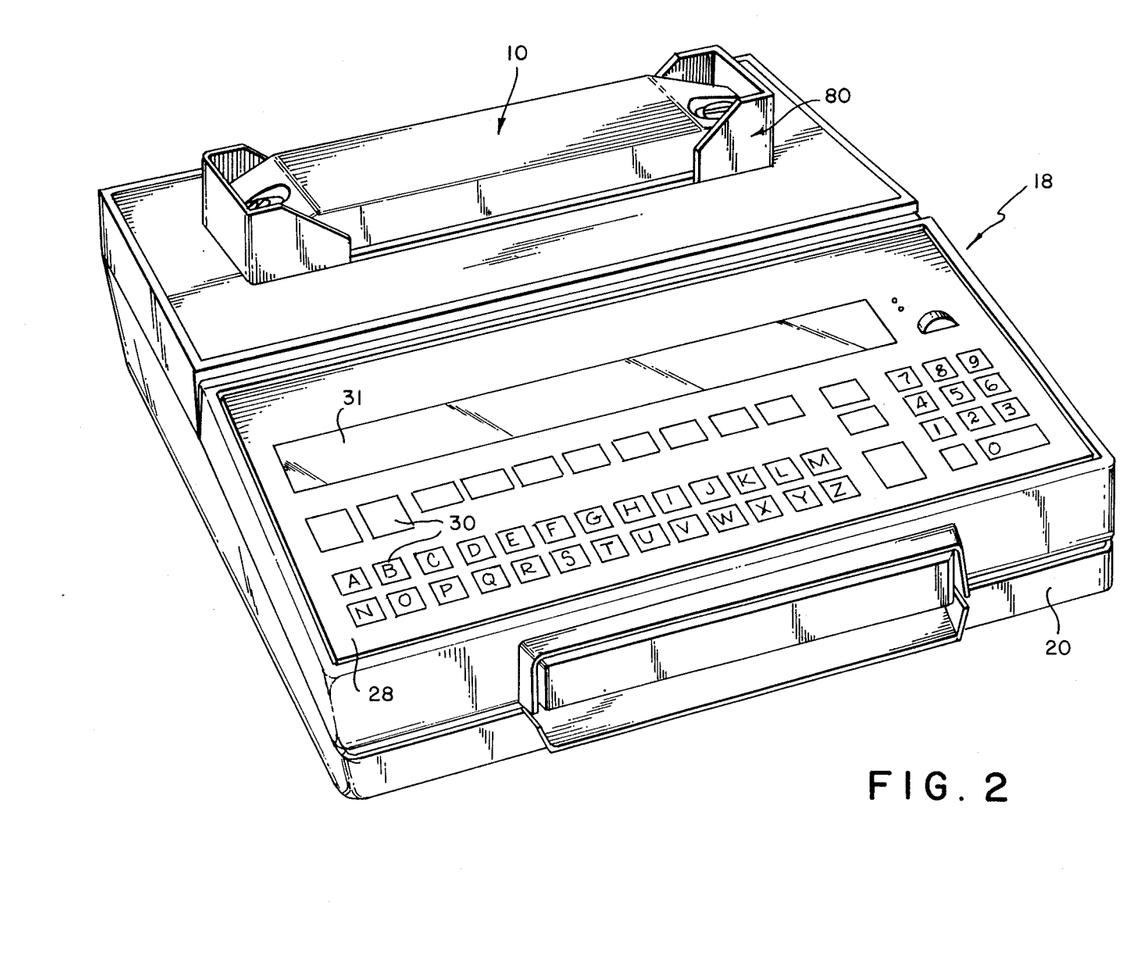
FIG. 2 is a perspective view of a programmer, including a keyboard on the programmer housing, for programming the transponder (or tag) with a unique sequence of signals.

A display 31 is also disposed on the housing 20. The display 31 is adapted to display the individual information coded into the programmable memory 16 to identify the tag 10. The display is operative to indicate the information programmed into the memory 16 when the detent 24 on the tag 10 is properly disposed on the detent 42 on the housing 20 and when a key 30 is depressed.

Various keys 30 may be included in the keyboard 28 on the housing 20 to control the programming of information into the memory 16 and the display of such information in the display 31. For example, the following keys may be included.

| Key | Function |
| --- | --- |
| PROG (short for "Program") | The operation of this key provides for the programming of information into the memory 16. |
| Verify | This key provides for a verification that information has been properly recorded in the memory 16 by displaying in the display 31 the information recorded in the memory 16 of the tag 10. |
| Light | This key provides for a lighting of the display 30 so that the information stored in the memory 16 can be viewed in the display under low-light conditions. |
| "Change" | The "Change" key provides for a change in the information programmed into the memory 16 at a selected position in the memory. |
| "Insert" | The "Insert" key provides for the insertion of programmed alphanumeric information at a selected position in the memory. When the alphanumeric information is programmed into the memory at such selected position, the alphanumeric information at every position in the memory of reduced binary significance is shifted through one alphanumeric position toward positions of reduced binary significance. This alphanumeric position constitutes six (6) binary bits. |
| ← | This key provides for the setting of a cursor in one direction (e.g., toward positions of increased binary significance). When the cursor has been set to the desired position, the "Change" key may be operated, by way of illustration, to provide for the insertion of updated or corrected alphanumeric information into the memory 16 at the desired position. |
| → | This key provides for the setting of a cursor in one direction (e.g., toward positions of reduced binary significance). When the cursor has been set to the desired position, the "Insert" key may illustratively be operated to provide for the insertion of alphanumeric information into the memory 16 at the desired position. |
| Func. | This key provides for the automatic entry into the memory 16 of a pre-set sequence of alphanumeric information. |
| "Enter" | When operated, this key provides for the entry into the memory 16 of alphanumeric information previously programmed for entry into the memory. |

In addition to the keys described above, keys identifying individual letters of the alphabet between "A" and "Z" and individual numbers between "0" and "9" are also provided.

In addition to the keys as described above, two (2) lights are provided on the keyboard 28. One of these lights is designated as "Ready". It becomes illuminated for a short period immediately after the tag has been programmed or verified, such as to signify to the operator that the tag is ready to be removed from the programmer. The other light is designated as "Lo Battery". This light becomes illuminated when the voltage of the battery in the programmer 18 for operating the tag 10 becomes reduced below a particular value. In this way, the operator can see that he has to replace the batteries powering the programmer 18 in order to program the tag 10 properly.

Figure 7:
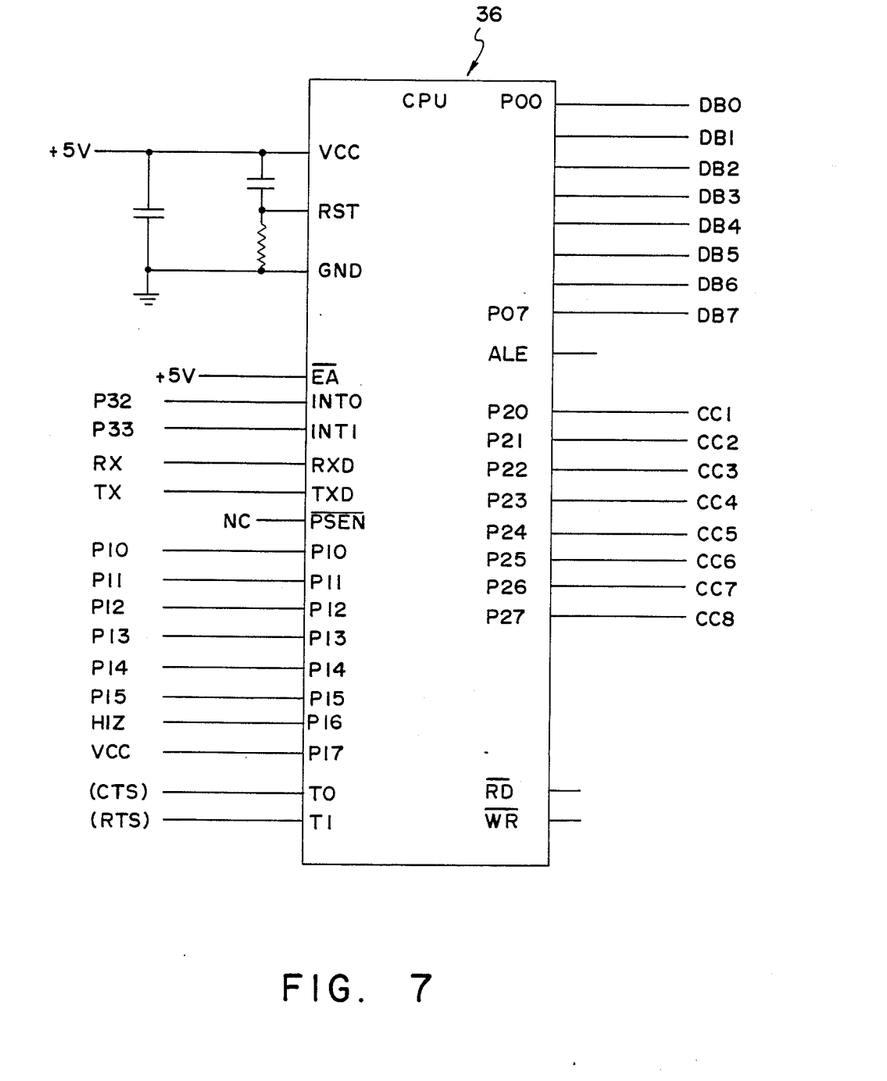
FIG. 7 is a diagram schematically illustrating the different electrical inputs to, and outputs from, the microprocessor which is included in the programmer and which is programmed to control and sequence all circuitry required to program a tag.

In one embodiment of the invention, a microprocessor 36 (FIG. 7) is included in the programmer 18. The microprocessor 36 may illustratively be a Model 8751 manufactured and marketed by Intel Corporation of Santa Clara, Calif. The microprocessor 36 may also have a number of lines (FIG. 7) each providing an input to, and/or an output from, the microprocessor. These lines (FIG. 7) may include the following:

| Line Designation | Function |
| --- | --- |
| VCC | A power supply within the programmer 18 provides a voltage for energizing the microprocessor. This voltage is provided to the microprocessor 36 when the VCC line is energized. |
| GND | The line "GND" provides a zero-level reference potential to the microprocessor 36. |
| P32 & P33 | These control access by the |

Figures 11, 11A:
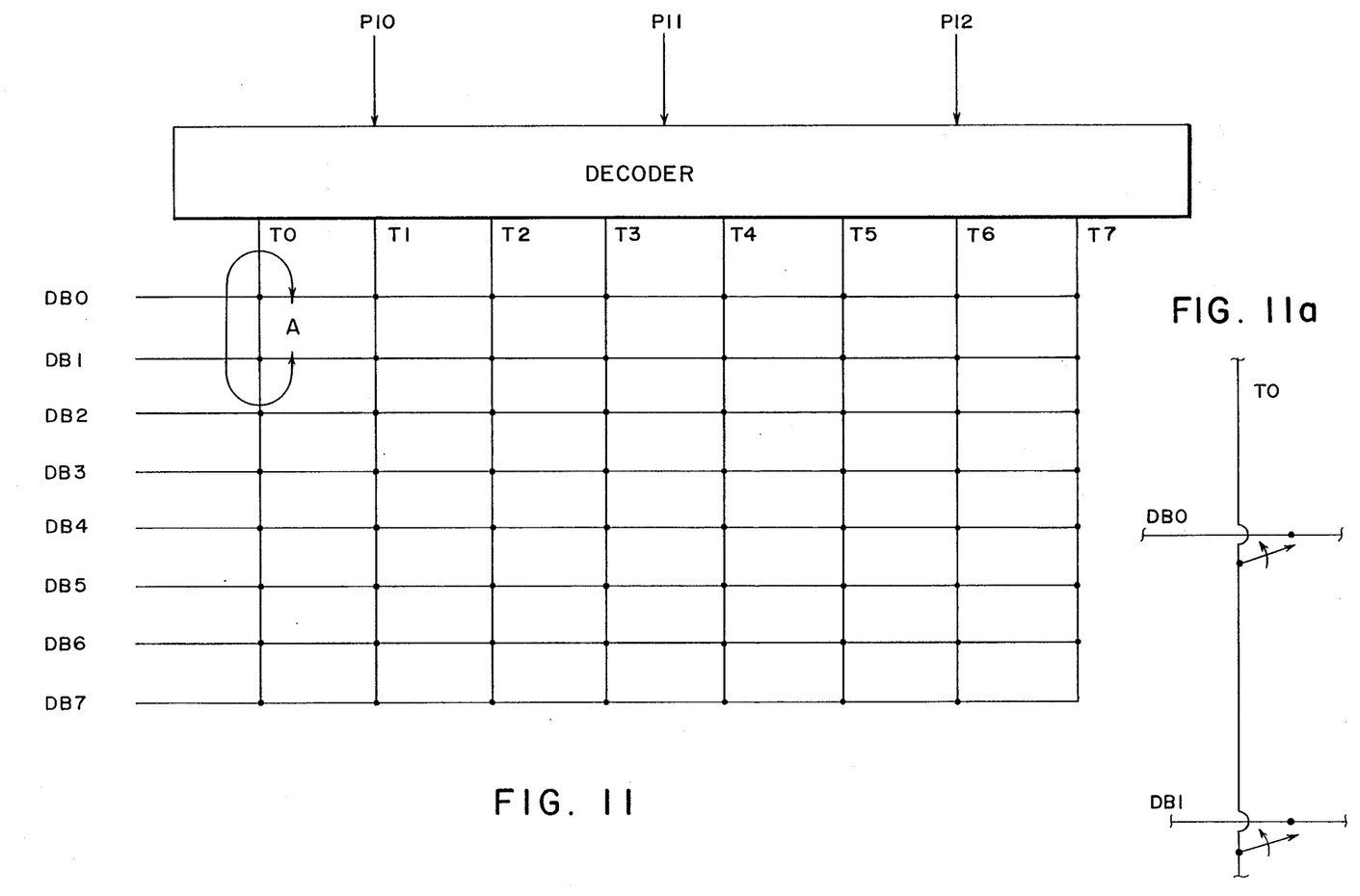
FIG. 11 illustrates a matrix for energizing individual circuits in accordance with the operation of the individual keys on the keyboard.
FIG. 11a indicates a switching arrangement which is provided at each of the intersecting positions in the matrix shown in FIG. 11.

| Line Designation | Function |
|---|---|
| | microprocessor 36 to the keyboard, non-volatile memory or display. The microprocessor 36 controls access to these devices according to the particular functions being performed by the programmer. |
| P10–P12 | The lines P10–P12 provide a binary coding of signals. These signals are decoded in a conventional manner in a decoder 35 (FIG. 11) to produce a signal on one (1) of eight (8) lines. These lines are indicated in FIG. 11 as "T0" through "T7". |
| DB0–DB7 | The lines DB0–DB7 are disposed in a matrix relationship (FIG. 11) with the lines T0–T7 in a conventional manner. In this matrix relationship, the lines DB0–DB7 may be considered to be disposed horizontally and the lines T0–T7 may be considered to be disposed vertically. Each intersection 37 in the matrix indicates an individual one of the keys on the keyboard. The horizontal and vertical lines do not make electrical contact unless a key common to an intersection 37 (FIG. 11a) between an individual horizontal line and an individual vertical line is depressed. Thus, by activating an individual one (e.g., T4) of the lines T0–T7 and sensing an individual one (e.g., DB5) of the lines DB0–DB7, only a horizontal line common to the activated line T4 (e.g. DB5) will be energized. |
| H1Z | The H1Z line provides two (2) modes. The first mode may prohibit the lines from accessing the tag. For example, the line H1Z may be provided with the first mode when the tag 10 is not properly disposed on the programmer 18 and thus it may damage the tag to allow electrical access. The line H1Z may be provided with a second mode when the tag 10 is properly disposed on the programmer 18 and information is to be introduced to the tag from the programmer to program or verify the tag. |
| RX, TX, CTS AND RTS | The CTS and RTS lines provide the necessary acknowledgments when transferring tag programming information to (through the RX line) and from (through the TX line) the programmer via a standard ASCII RS232 data port. This provides an alternate means of transferring tag programming information to the programmer (from, for example, a host computer) if the keyboard 28 is not desired. |
| CC2 and CC7 | The pins CC2 and CC7 (FIGS. 7 and 8) provide for the production of individual ones of three (3) voltages on the "Program" pin (FIG. 9) in the detent 24 on the tag 10 when the detent 24 mates properly with the detent 42 on the housing 20 of the programmer 18. These three (3) voltages may be zero (0) volts, five (5) volts and eighteen (18) volts. When eighteen (18) volts are produced on the "Program" pin, bulk erasure of all memory positions can be performed. When five (+5) volts are produced |

| Line Designation | Function |
|---|---|
| | on the "Program" line, information can be introduced from the programmer 18 to the tag 10 to program the tag. Upon the production of zero (0) volts on the "Program" pin, the tag memory cannot be modified in any way. |
| CC1 and CC8 | The pins CC1 and CC8 (FIG. 7 and circuitry identical to that shown in FIG. 8) provide for the production of individual ones of three (3) voltages on a "Vpp" pin in the detent 24 on the tag 10 when the detent 24 mates with the detent 42 on the housing 20 of the programmer 18. These three (3) voltages may be zero (0) volts, five (5) volts and eighteen (18) volts. When +18 volts are produced on the Vpp pin, the tag reassigns all of its interconnecting pins (FIG. 9) to those functions required to program the programmable memory 16. When +5 volts are produced on the Vpp pin, the tag is in its normal operating mode for communication with the reader 14. In this mode, the tag cannot be programmed. Upon the production of 0 volts on the Vpp pin, the tag 10 is inactivated. As will be discussed subsequently, programming information can be introduced to the tag 10 only when combinations of particular voltages are produced on various pins such as the "Program" and "Vpp" pins. |
| CC3 | The CC3 pin (FIGS. 7 and 9) is the data a pin. All data entered into the programmable memory 16 of the tag 10 is passed from the programmer 18 to the tag 10 via the pin CC3. The CC3 pin introduces a binary "1" (or "0" ) to the programmable memory 16 in the tag 10 when the logic level of the signal on the CC3 pin is respectively high (or low) and other conditions, such as particular voltages on the Program and Vpp pins, exist. The CC3 pin can produce such signals only when the detents 22 and 24 mate. Such signals are indicated as "D" in FIG. 9. |
| CC4 | Like other pins such as the Program, Configure, and VPP pins, the CC4 pin provides for the selection of options which control the particular operation to be performed with respect to the programmable memory 16. Specifically, the CC4 pin provides for the selection of a read or write operation. The CC4 pin can produce such signals only when the detents 22 and 24 mate. Such signals are indicated as "DB" in FIG. 9. |
| CC5 | The CC5 pin (FIGS. 7 and 9) provides for the production of clock signals when the detent 24 on the tag 10 mates with the detent 22 on the housing 20 of the programmer 18. As will be seen from the subsequent discussion, the clock signals are produced only at specified times during the operation of programming information in the memory 16 in the tag 10. |
| CC6 | Like other pins such as the Pro- |

| Line Designation | Function |
| --- | --- |
| | gram, DB and Vpp pins, the CC6 pin provides for the selection of options which control the particular operation to be performed with respect to the programmable memory 16. The CC6 pin (FIGS. 7 and 9) provides for the production of a voltage on a "Configure" pin (FIG. 9) when the detent 24 on the tag 10 mates with the detent 42 on the housing 20 of the programmer 18 This voltage may have two magnitudes. One voltage magnitude (0 Volts) provides for the coding of the alphanumeric indications in the programmable memory 16. The other voltage magnitude (+5 V) provides for the selection of individual capacitors in the tag to insure the generation of the signals by the tag at the first and second frequencies. |

Figures 4, 5, 6, 16:
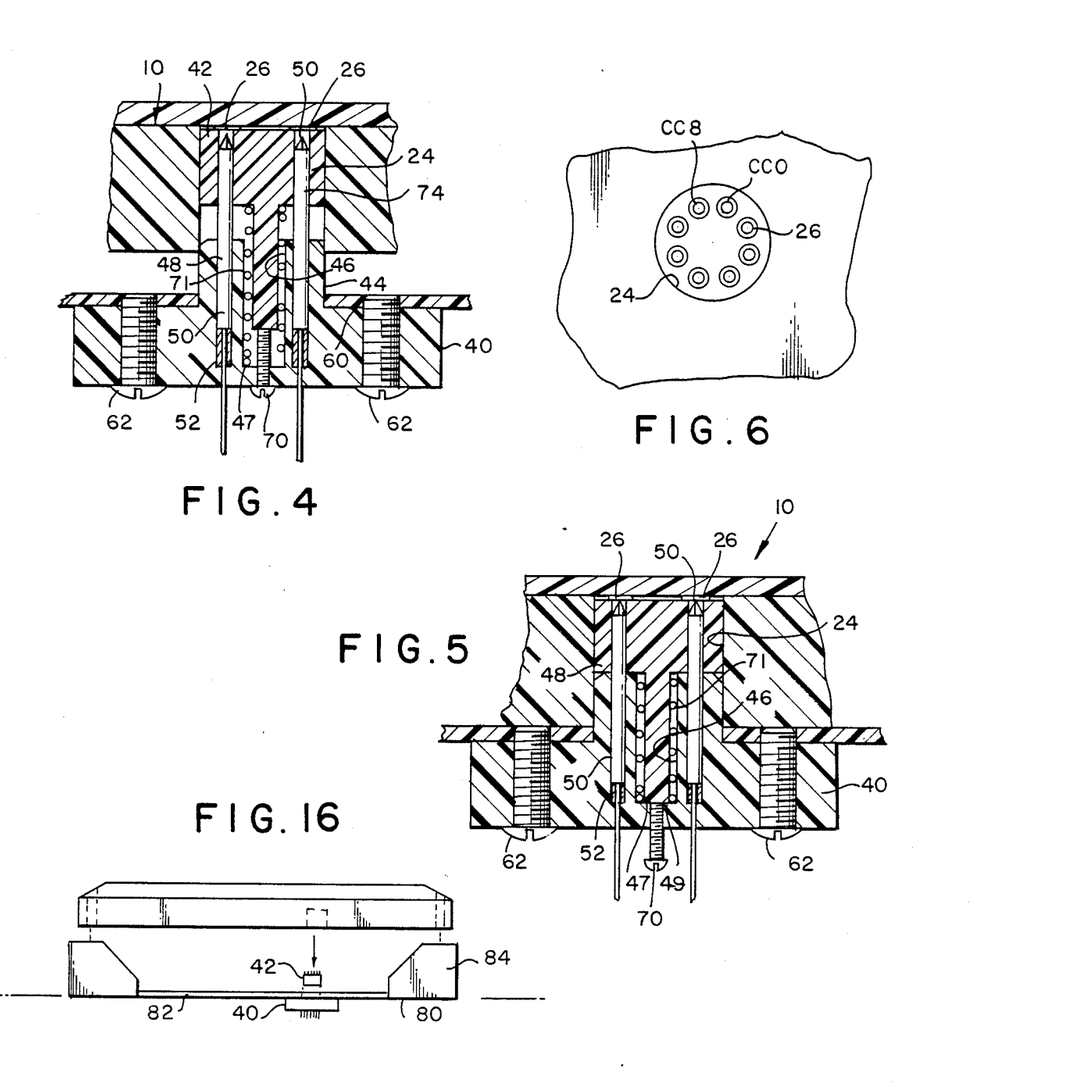
FIG. 4 is a sectional view illustrating the construction of a pin block and a plunger for producing an electrical coupling between the programmer and the tag when the tag is disposed properly on the programmer.
FIG. 5 is a sectional view similar to that shown in FIG. 4 and illustrates the relative disposition of the pin block and the plunger shown in FIG. 4 when the tag is disposed properly on the plunger and is pressed against the programmer to provide an electrically operative relationship between the programmer and the tag.
FIG. 6 is a sectional view taken substantially on the line 6—6 of FIG. 3.
FIG. 16 is an exploded view of the tag and the programmer and of apparatus on the programmer for holding the tag in proper position on the programmer, FIG. 16 also illustrating the detents of FIGS. 4, 5 and 6 in schematic form.

FIGS. 4 and 5 illustrate the construction of the detent 42 on the housing 20 of the programmer 18. As will be seen, the detent 42 includes a pin block 40 and a head 42. The pin block 40 has a shank 44. A bore 46 extends through the pin block 40 and the shank 44 of the pin block 40 and defines a threaded neck portion 47 with a retaining screw 70. A cavity 49 is provided in the shank 44 of the pin block 40. The head 42 is spring-loaded by way of a spring 71 positioned around the head within the cavity 49 such that the head 42 can travel independently from the spring-loaded pins 50. Holes 48 are provided in the head 42 and pin block 40 and are equally spaced around the bore 49 so as to mate with the pads shown in Figure 6. The holes 48 receive the spring-loaded pins 50 which mate with the pads 26 on the tag 10 when the tag is properly disposed on the programmer 18. The pins 50 are spring-loaded as at 52. The spring-loaded pins 50 function as the interconnections between the tag and programmer as defined in FIG. 9. A pair of threaded holes 60 are diametrically disposed on the pin block to provide for an attachment of the pin block to the housing as by threaded bolts 62.

When the tag 10 is to be programmed, the detent 24 on the tag 10 is disposed on the head 42 on the housing 20. The tag 10 is then depressed downwardly in FIG. 2. This moves the head 42 downwardly in FIG. 4. When the head 42 has been depressed sufficiently, pins 50 become sufficiently exposed to contact the pads 26 on the tag 10. This provides for the introduction to the tag 10 of information programmed into the tag by the operation of the different keys 30 on the keyboard 28.

A holder 80 (FIG. 16) is provided on the top surface of the housing 20 of the programmer 18. The holder 80 includes a base plate 82 and a pair of upwardly disposed retainer portions 84 at the opposite ends of the holder 80. Each of the retainer portions 84 is integral with the base plate 80 and is provided with a U-shaped configuration in plan view.

The tag 10 is inserted into the holder with the pads 26 extending downwardly to the pins 50 in the head 42. The head 42 is mounted upwardly on the base plate 82 and is retained in position by the pin block 40. In this way, when the tag 10 is properly inserted on the holder 80 and is pressed downwardly in FIG. 16, the pads 26 on the tag 10 make contact with the different pins in the programmer 18.

Figure 8:
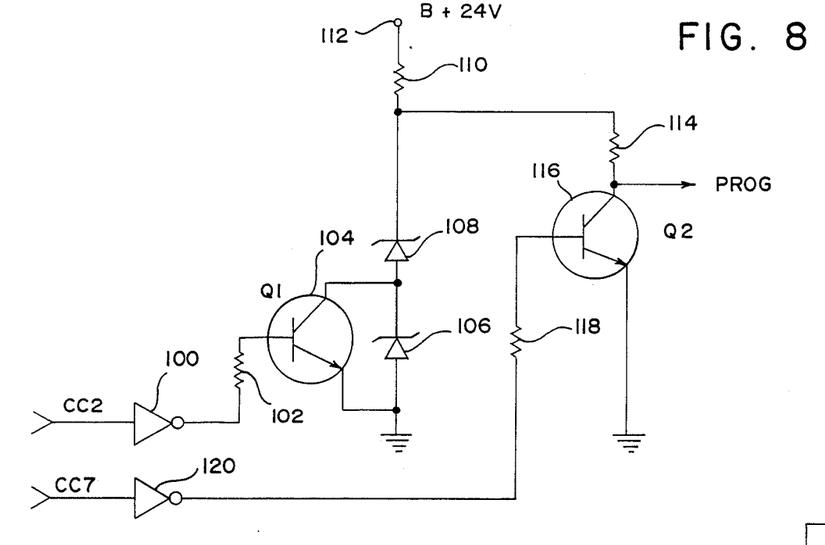
FIG. 8 is a diagram of a circuit for receiving two input signals and for producing one of three different output voltages in accordance with the logic levels of the two input signals.

FIG. 8 illustrates a circuit for producing the Program signal in accordance with the introduction of signals on the CC2 and CC7 lines. The signal on the CC2 line is inverted g as at 100 and the inverted signal is introduced through a resistance 102 to the base of a transistor 104 which may be an npn type. The emitter of the transistor 104 is connected to a reference potential such as ground and the collector of the transistor 104 has a common connection with the anode of a diode 106, the cathode of which is connected to the reference potential such as ground. The diode 106 operates as a zener diode to provide a regulated voltage such as twelve (12) volts when it is conductive.

The collector of the transistor 104 also has a common connection with the cathode of a diode 108 which acts as a zener diode to produce a voltage of five volts (+5 V.) when it is conductive. The anode of the diode 108 is connected through a resistance 110 to a source 112 of positive voltage. The source 112 may provide a suitable voltage such as twenty four (+24) volts. The anode of the diode 108 is also connected to one terminal of a resistance 114, the other terminal of which is common with the collector of a transistor 116 and with the Program pin. The emitter of the transistor 116 is connected to lg the reference potential such as ground and the base of the transistor 116 may be connected through a resistance 118 to an inverter 120 which receives the signals from the line CC7.

The signals on the CC2 and CC7 lines are respectively inverted by the inverters 100 and 120. Thus, when the logic levels of the signals on the CC2 and CC7 lines are low, signals having a high amplitude are respectively introduced to the bases of the transistors 104 and 116 to make these transistors conductive. The conductivity of the transistor 116 causes a ground potential to be produced on the collector of the transistor and to be introduced to the Program line. Similarly, a ground potential is produced on the Program line when the logic level of the signal on the CC7 line is low but the logic level of the signal on the CC2 line is high.

Figures 8A, 9:
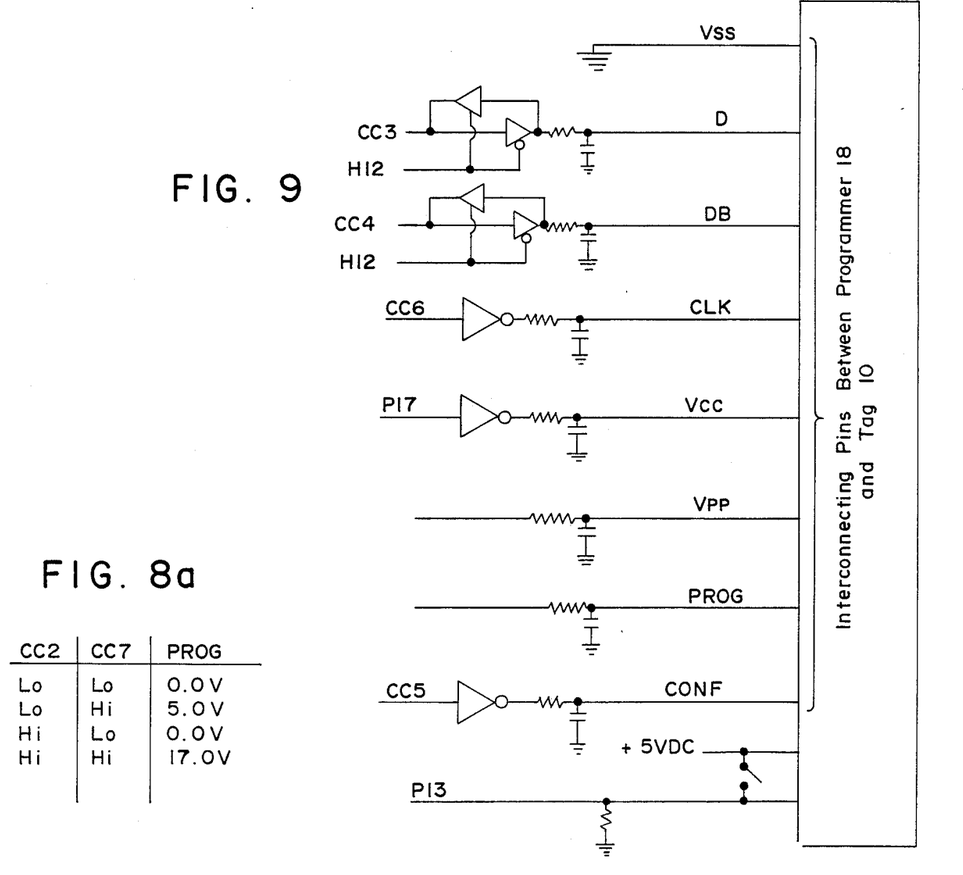
FIG. 8a is a chart illustrating the different output voltages produced by the circuitry shown in FIG. 8 when the two input lines receive signals with different combinations of logic levels.
FIG. 9 is a block diagram showing the signals introduced to the individual ones of the pins shown in FIG. 6 as being included in the tag detent.

A ground potential is produced on the Program pin when the tag 10 is being disposed in coupled relationship with the programmer 18 or is being removed from the programmer. The production of signals of zero volts (0 V.) on the Program line upon the introduction to the CC7 line of signals having a low logic level is illustrated in FIG. 8a. As will be seen in FIG. 8a, the ground potential is produced on the Program pin under such circumstances whether the voltage on the CC2 line is low or high.

At certain times, the logic level of the signal on the CC2 line may be low and the logic level of the signal on the CC7 line may be high. The signal on the CC7 line is inverted so that a signal of low amplitude is introduced to the transistor 116 to make the transistor non-conductive. At the same time, the transistor 104 is conductive as result of the inversion of the signal having a low logic level on the CC2 line. Because of the conductivity of the transistor 104, current flows through a circuit including the voltage source 112, the resistance 110, the diode 108 and the transistor 104. This current produces a voltage of approximately five (+5) volts across the diode 108, which acts as a zener diode under such circumstances. This voltage is introduced to the Program pin. The production of five volts (+5 V.) on the Program pin under such circumstances is indicated in FIG. 8a.

At certain times, the logic levels of the signals on the CC2 and CC7 lines may be simultaneously high. Since these signals are respectively inverted by the inverters 100 and 120, the transistors 104 and 116 are simultaneously non-conductive. This causes the voltage on the source 112 to be applied through a circuit including the resistance 110 and the diodes 108 and 106. The diode 106 functions like a zener diode to produce a voltage of approximately twelve (+12) volts across the diode under such circumstances. Similarly, a voltage of approximately +5 volts is produced across the diode 108. This causes a voltage of approximately seventeen (+17) volts to be produced on the Program pin. When this voltage is produced to the Program pin, programming information is able to be introduced into the programmable memory 16 in the tag 10. The production of seventeen volts (+17 V.) on the Program pin under such circumstances is indicated in FIG. 8a.

Circuitry similar to that shown in FIG. 8 and lg described above may be used to generate different voltages on the Vpp pin (FIG. 9) in accordance with the introduction of combinations of signals of low and high logic levels to the CC1 and CC8 lines (FIG. 7). For example, when a low voltage is introduced to the CC8 line, the voltage on the Vpp pin is approximately zero volts (0 V.). Similarly, when signals of low and high logic levels are respectively introduced simultaneously to the CC1 and CC8 lines, a voltage of approximately five volts (+5 V.) is produced on the Vpp pin. Upon the introduction of signals of high logic levels simultaneously to the CC1 and CC8 lines, a voltage of approximately seventeen volts (+17 V.) is produced on the Vpp pin.

Figure 12:
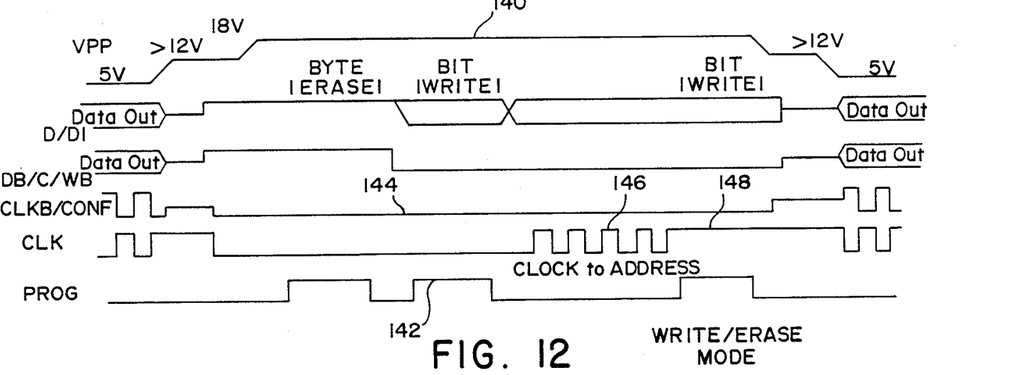
FIG. 12 illustrates the production on the different pins shown in FIGS. 6 and 10 of signals having individual waveforms when information is being introduced into the tag to program the memory in the tag with a unique code to identify the object with which the tag is associated.

FIG. 12 illustrates signal waveforms which are produced when information is to be programmed into the memory 16. As will be seen, information can be programmed into the memory 16 when a voltage greater than twelve volts (12 V.) is produced on the Vpp pin, as indicated at 140 in FIG. 12, and when five volts (+5 V.) is produced on the Program pin., as indicated at 142 in FIG. 12. Furthermore, information can be programmed into the memory 16 only when zero volts (0 V.) are produced on the Configure pin as indicated at 144 in FIG. 12.

In addition to the conditions discussed in the previous paragraph, certain additional conditions have to be met in order for information to be programmed into the memory 16. For example, clock signals have to be produced through a number of cycles, as indicated at 146 in FIG. 12, before information can be programmed into the memory 16. During the production of these clock signals, the address of the next position (or bit) to receive information for recording in the memory 16 is provided For example, if the binary value "1" is to be recorded at position (or bit) 56 in the memory, the position (or bit) is addressed during the production of the clock signals 146. Thereafter, a positive voltage is produced on the Clock pin as indicated at 148 in FIG. 12. During the production of the positive voltage 148 on the Clock pin, information at the position (or bit) 56 is programmed into the memory if all of the conditions such as discussed in this paragraph and the previous paragraph have been met.

When all of the conditions discussed in the previous two (2) paragraphs have been met, information can be programmed into the memory 16 through the D/DI pin. As previously described, "D" indicates binary "1" data with a high logic level (+5 volts) and indicates binary "0" data with a low logic level (0 volts). The time for programming a data bit into the memory 16 is indicated by two vertical markers and the words "Bit Write" between the vertical markers. Information at a particular position (or bit) in the memory can also be erased at such a selected position (or bit) by applying a high logic level (+5 volts) to the DB and D pins. This is indicated in FIG. 12 by the words "Byte Erase".

The Configure pin receives five volts (5 V.) enabling the selection of capacitors within an integrated circuit chip in the tag 10. The sequence to select a deselect a capacitor is identical to the bit write sequence described in the previous two paragraphs except for the logic level of the configures pin. These capacitors are generally indicated at 149 in FIG. 10. The capacitors 149 are provided to insure that the modulating signal coding for the different alphanumeric characters are produced precisely at first and second frequencies. For example, as previously described, the first frequency for the modulating signals may be forty kilohertz (40 Khz) and the second frequency for the modulating signals may be twenty kilohertz (20 Khz).

In successive units of the tag 10, the integrated circuitry producing the modulating signals at the first and second frequencies may have sufficient variations so that the first and second frequencies are not precisely at forty kilohertz (40 Khz) and twenty kilohertz (20 Khz), respectively. Individual ones of the capacitors 149 may then be selected for each individual unit of the tag 10 so that the capacitors in the integrated circuits in the tag 10 are trimmed to produce the modulating signals precisely at the frequencies of forty kilohertz (40 Khz) and twenty kilohertz (20 Khz).

Figures 10, 15:
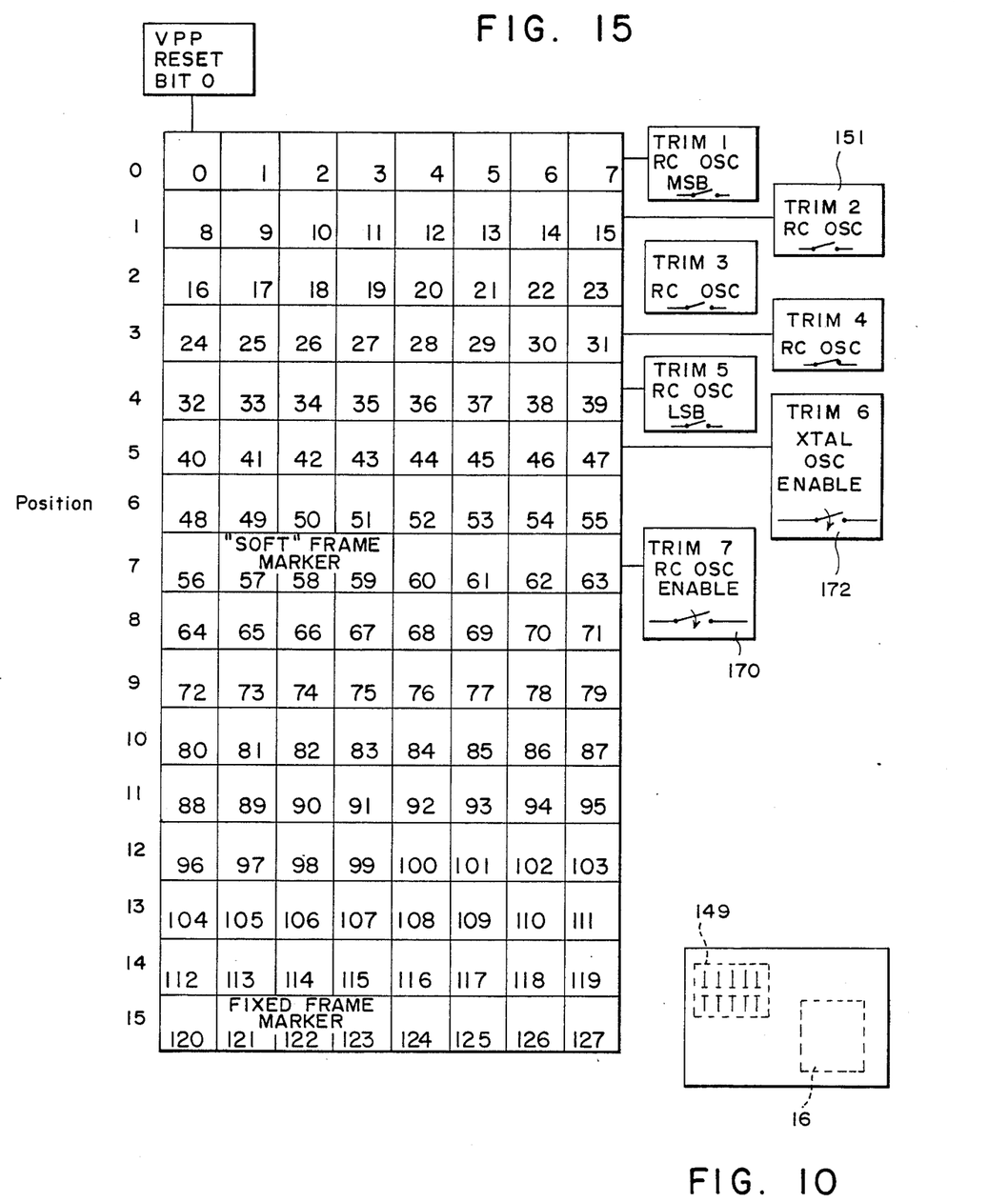
FIG. 10 is an enlarged schematic diagram illustrating certain electrical features in the tag.
FIG. 15 is a table schematically illustrating different positions (or bits) included in a programmable memory in the transponder (or tag) and further identifying the functions to be performed at such different positions.

The voltage—e.g. five volts (5 V.)—on the Configure pin enables the selection of the capacitors 149 to obtain the g production of the modulating signals precisely at the first and second frequencies. The capacitors 149 are selected by closing electronic switches disposed at particular positions in the memory 16, each switch being associated with an individual one of the capacitors 149. For example, when the memory 16 has one hundred and twenty eight (128) positions (or bits) as shown in FIG. 15, switches 151 (schematically illustrated in FIG. 15) may be disposed at positions (or bits) 7, 15, 23, 31 and 39. This is schematically illustrated in FIG. 15.

The individual closures of the switches 151 control the connection into the integrated circuitry in the tag 10 of individual ones of the capacitors 149 for trimming the resonant circuitry which produces the signals at the first and second frequencies. Such resonant circuitry may be formed in a conventional manner from resistances, capacitances and other active circuit elements. The selected ones of the capacitors 149 are effective to trim the modulating frequencies in such resonant circuitry when a switch is closed at position (or bit) 63 in the memory 16. This enables a resistor-capacitor oscillator in the tag. Alternatively, a crystal oscillator may be energized when a switch is closed at position (or bit) 47 in the memory 16. The selection of individual ones of the capacitors 149 as described in the previous paragraphs has an equal effect when using the resistor-capacitor oscillator or the crystal oscillator.

The selection of the individual ones of the capacitors 149 can be obtained only when a voltage having a high logic level is produced on the Configure pin. The selection of the individual ones of the capacitors 149 can be provided only when the logic level of the signal on the Configure pin is five volts (+5 V.) (see 162 in FIG. 13). As will be seen from FIG. 13, the individual ones of the capacitors 149 can then be selected only when the voltage on the Vpp pin is at least twelve volts (+12 V.) (see 163 in FIG. 13), the voltage on the Program pin is five volts (+5 V.) (see 164 in FIG. 13) and clock signals are not provided on the Clock pin (see 165 in FIG. 13). Under such circumstances, individual ones of the capacitors 149 can be inserted into the resonant circuitry dependent upon the position (or bit) selected during the production of a plurality of clock signals such as those illustrated at 166 in FIG. 13.

Figure 14:
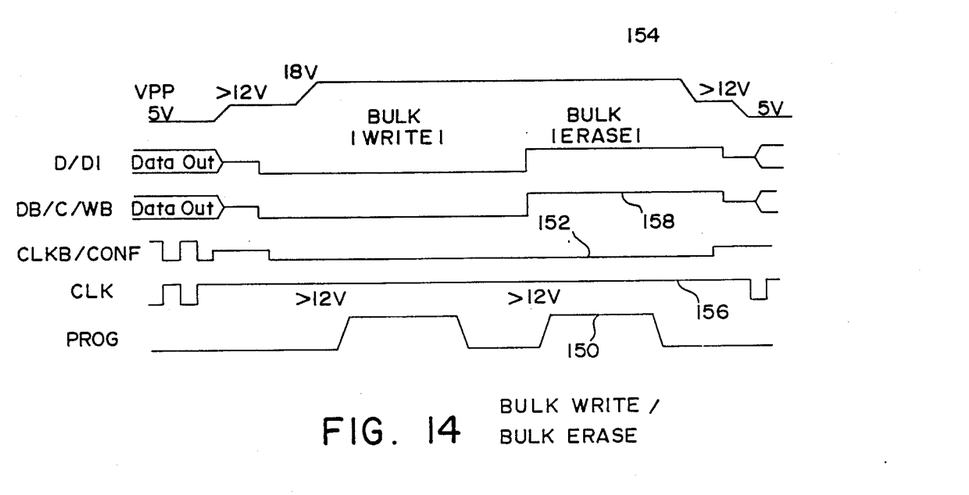
FIG. 14 illustrates the production on the pins shown in FIGS. 6 and 10 of signals having individual waveforms when the programmer is in a mode to provide for the bulk erasure of information in the programmable memory in the tag.

FIG. 14 illustrates the waveforms of signals which are produced when a bulk erase mode is to be provided with respect to information programmed into the memory 16. In the bulk erase mode, information previously recorded in the memory 16 is erased on a bulk basis. This results in a binary "1" for each binary bit in the memory 16.

When information in the memory 16 is to be bulk erased, the Program pin is provided with a voltage of eighteen volts (+18 V.) as illustrated at 150 in FIG. 14, and the Configure pin is provided with zero volts (0 V.) as illustrated at 152 in FIG. 14. Furthermore, the Vpp pin is provided with eighteen volts (+18 V.) as illustrated at 154 in FIG. 14, and the Clock pin is provided with a continuous signal having a high logic level as illustrated at 156 in FIG. 14. The DB/C/WB pin is also provided with a signal having a high logic level as indicated at 158 in FIG. 14. When all of these conditions have been met, information in the memory 16 can be erased on a bulk basis by introducing to the D/DI pin a signal having a high logic level corresponding to a binary value of "1".

FIG. 15 illustrates a map showing different positions (or bits) in the memory 16. As previously described, the switches 151 controlling the selection of individual ones of the capacitors 149 are disposed at positions (or bits) 7, 15, 23, 31 and 39. A switch 170 enabling the selection of the resistor-capacitor oscillator is disposed at position (or bit) 63 in FIG. 15 and a switch 172 enabling the selection of the crystal oscillator is disposed at position (or bit) 47 in FIG. 15. As previously described, either the resistance-capacitance oscillator or the crystal oscillator is selected to generate the modulating signals at the first and second frequencies when coded information is transmitted from the tag 10 to the reader 14.

A fixed frame marker is programmed into the memory 16 at positions (or bits) 121 and 122. The fixed frame marker is identified by an individual sequence of signals at the first and second frequencies. This sequence is different from the sequence of signals generated at the first and second frequencies to identify a binary "1" or "0". For example, the fixed frame marker may be identified by six successive cycles of the signal at the first frequency and than one (1) cycle of the signal at the second frequency. The fixed frame marker identifies the beginning of the unique combination of alphanumeric characters programmed into the memory 16 to identify the tag 10. A suitable sequence of signals at the first and second frequencies to identify the fixed frame marker is disclosed in application Ser. No. 885,248.

There are one hundred and twenty eight (128) positions (or bits) in the memory 16. Because of this, the information to be programmed into the first half of the memory 16 may be duplicated in the second half of the memory 16. This may be provided by programming into positions (or bits) 57 and 58 a "soft" frame marker corresponding to the fixed frame marker. Creating a fixed frame marker and a "soft" frame marker is advantageous because it reduces the time required to process the information in the memory 16. This reduces by approximately one half (½) the time required for the tag 10 to send successive sequences of signals in the individual pattern at the first and second frequencies to identify the object 12. It will be appreciated that the marker in the positions (or bits) 57 and 58 in FIG. 15 in the memory 16 is "soft" because it is optional whether the "soft" frame marker is provided.

The programmer 18 disclosed above and shown in the drawings has certain important advantages. The programmer provides a simple and reliable programming of the tag 10 so that the tag is able to identify the associated object 12 to the reader 14. The programmer 18 is also able to trim the capacitors 149 in the tag so that the tag is able to transmit to the reader 14 sequences of signals precisely at the first and second frequencies in a pattern identifying the object 12. The programmer 18 becomes operative to provide the programming functions only when the tag 10 is properly disposed on the programmer housing 20 so that the detents 42 and 24 mate.

Figure 13:
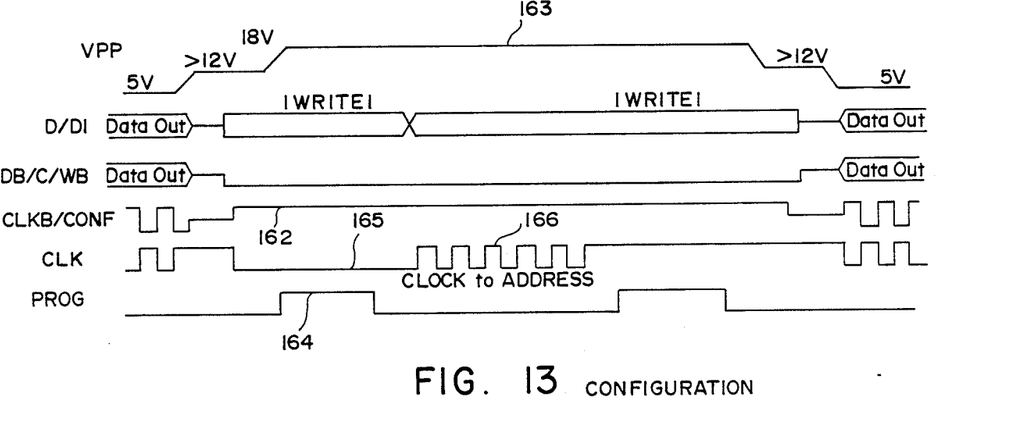
FIG. 13 illustrates the production on the pins shown in FIGS. 6 and 10 of signals having individual waveforms when the programmer is in a mode to select capacitors for insuring that the first and second frequencies being provided for the signals to be transmitted from the transponder to the reader have precise and predetermined values.

The programmer 18 is able to (a) program the memory 16 in the tag 10, (b) trim the capacitors 149 in the tag and (c) bulk erase information in the memory 16 only when certain conditions have been met. These conditions are illustrated in FIGS. 12, 13 and 14 and have been described fully above. In order to provide these conditions and obtain a proper operation of the programmer, software has to be provided for the programmer. This software is specified in Exhibit A which is attached to this application.

The programmer also has other advantages. It provides three (3) different voltages on a particular pad in the tag. The first voltage on the particular pad provides for a programming of information into the programmable memory on the tag. The second voltage on the particular pad in the tag provides for the transmission of signals at the first and second frequencies from the tag 10 to the reader 14 to identify the tag at the reader. The third voltage on the particular pad in the tag inactivates the tag.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

I claim:

1. In combination for programming a tag which is adapted to be provided with an individual code and to be disposed on an object for use with a reader displaced from the object to obtain an identification of the object by the reader in accordance with the individual code on the tag, the tag having a programmable memory for storing the individual code and for obtaining the production of a sequence of signals representative of such individual code upon an interrogation by the reader, a housing, means disposed on the housing for receiving the tag and for providing for the passage of signals between the housing and the tag when the tag is properly disposed on the housing, a keyboard disposed on the housing and having a plurality of keys each depressible to indicate an individual one of a plurality of alphanumeric characters and programmer functions, and means including a microprocessor disposed within the housing and operatively coupled to the keys in the keyboard for providing for the programming of the tag in accordance with the depression of the individual keys in the keyboard when the tag is disposed on the housing.

2. In a combination as set forth in claim 1, means associated with the microprocessor for providing for the programming of the tag from a source displaced from the programming means.

3. In a combination as set forth in claim 1, the tag being constructed to produce a plurality of signals at first and second frequencies in a sequence indicative of the code programmed in the tag, means including a plurality of capacitors disposed within the housing for providing for the generation of signals at frequencies by the tag to the reader to identify the object at the reader, and means disposed within the housing for programming the capacitors in the frequency-selecting means to obtain the selection of the individual frequencies.

4. In a combination as set forth in claim 1, means for providing for the entry into the programmable memory of a fixed frame marker to identify the beginning of the code programmed into the memory to identify the object, and means for providing for the entry of the individual code for the tag at particular positions in the programmable memory on the tag relative to the position of the fixed frame marker.

5. In combination for programming a tag which is adapted to be provided with an individual code and to be disposed on an object for use with a reader displaced from the object to obtain an identification of the object by the reader in accordance with the individual code on the tag, the tag having a programmable memory for storing the individual code and for obtaining the production of a sequence of signals representative of such individual code upon an interrogation by the reader, the tag having a plurality of different pads in a detent portion to control the operation of the tag in accordance with the energizing of such pads, a housing, a keyboard disposed on the housing and having a plurality of keys each operable to select an individual one of a plurality of alphanumeric characters and programmer functions, detent means disposed in the housing for mating with the detent portion on the tag, the detent means on the housing having a plurality of different pins for producing an electrical continuity with the different pads in the detent portion on the tag to provide for the operation of the tag in accordance with the energizing of such pads, means for providing for the energizing of particular pads on the tag for a programming of the individual code in the programmable memory on the tag, and means responsive to the energizing of the particular pads on the tag and responsive to the operation of the individual keys in the keyboard for programming the individual code in the programmable memory in the tag.

6. In a combination as set forth in claim 5, the tag being constructed to generate a sequence of signals at first and second frequencies in accordance with the individual code programmed in the programmable memory in the tag, there being resonant circuits in the tag, means for providing for the adjustment in the values of the first and second frequencies at which the signals coding for the tag are to be generated by the tag to the reader, and means for providing for the energizing of the particular pads on the tag in a pattern of voltages different from the pattern providing for the programming of the programmable memory in the tag, to obtain the adjustment in the values of the first and second frequencies at which the signals coding for the tag are to be generated and transmitted to the reader.

7. In a combination as set forth in claim 5, means for providing for the production of a plurality of individual voltages, means for providing for the selection of individual ones of such different voltages, and means for providing for the programming of the tag only upon the selection of individual ones of such different voltages and the introduction of such individual ones of such different voltages to the particular pads on the tag.

8. In combination as set forth in claim 6, means for providing for the production of a plurality of individual voltages, means for providing for the selection of individual ones of such different voltages, means for providing for the programming of the tag upon the selection of first individual ones of such different voltages and the introduction of such individual ones of such different voltages to the particular pads on the tag, and means for providing for the adjustment in the values of the first and second frequencies for the coding signals upon the selection of second individual ones of such different voltages and the introduction of such second individual ones of such different voltages to particular pads on the tag.

9. In combination for programming a tag which is adapted to be provided with an individual code and to be disposed on an object for use with a reader displaced from the object to obtain an identification of the object by the reader in accordance with the individual code on the tag, the tag having a programmable memory for storing the individual code and for obtaining the production of a sequence of signals representative of such individual code upon an interrogation by the reader, a housing, detent means disposed on the housing for cooperating with the tag to provide for the programming of the individual code in the programmable memory o the tag when the tag is disposed on the detent means on the housing, a keyboard disposed on the housing and including a plurality of keys each operable to provide an indication of an individual one of a plurality of alphanumeric characters means for providing for the operation of individual ones of the keys to program, in the programmable memory on the tag, the individual code identified by the operated keys, means for providing for the programming of the individual code in the programmable memory on the tag from a source external to the housing and from the keys on the housing, and means for providing for the selection of an individual one of the keyboard and the external source to provide the programming in the programmable memory on the tag.

10. In a combination as set forth in claim 9, a display panel in the housing, and means associated with the display panel for programming the programmable memory on the tag to provide a display in the display panel of the individual code programmed in the programmable memory on the tag.

11. In a combination as set forth in claim 10, the tag being constructed to generate a sequence of signals in an individual pattern of first and second frequencies in representation of the individual code programmed in the programmable memory on the tag, the tag being constructed to provide for adjustments in the frequencies of the signal generation to assure the generation of signals at the first and second frequencies, and means for programming the tag to obtain the adjustments in the frequencies of the signal generation to assure the generation of signals at the first and second frequencies in a sequence representative of the individual code programmed in the programmable memory on the tag.

12. In a combination as set forth in claim 11, means for providing for the bulk erasure of information in the programmable memory on the tag, means for providing for bulk erasure of information on a controlled basis in the programmable memory on the tag.

13. In combination for programming a tag which is adapted to be provided with an individual code and to be disposed on an object for use with a reader displaced from the object to obtain an identification by the reader in accordance with the individual code on the tag, the tag having a programmable memory for storing the individual code and for obtaining the production of a sequence of signals in representation of such individual code upon an interrogation by the reader, first and second lines, means for providing for the production on the first line of voltages of different magnitudes, means for providing for the production on the second line of signals having a first logic level to provide for the programming of the programmable memory on the tag at such times, a plurality of typewriter keys each operable to provide for the programming of an individual one of the indications in an alphanumeric code, and means responsive to the production of a voltage of a particular magnitude on the first line and the production on the second line of the voltage of the first logic level to provide for the programming of alphanumeric information in the programmable memory on the tag in accordance with the operation of the individual keys in the plurality.

14. In a combination as set forth in claim 13, means for providing for the production on the second line of signals having a second logic level, and means responsive to the production of the voltage of the particular magnitude on the first line and the voltage of the second logic level on the second line for adjusting the first and second frequencies for the transmission of the alphanumeric information in the programmable memory on the tag.

15. In a combination as set forth in claim 14, a third line, means for providing on the third line voltages having first, second and third logic levels, and means responsive to the voltage of the first logic level on the third line for providing for the recording of the alphanumeric indications in the programmable memory on the tag, responsive to the voltage of the second logic level on the third line for providing for the transmission of signals between the tag and the reader and responsive to the voltage of the third logic level on the third line for inactivating the tag.

16. In a combination as set forth in claim 15, clock signal means for providing signals having first and second logic levels, the means providing for the recording of the alphanumeric information in the first line being operative only upon the occurrence of signals having the first logic level from the clock signal means, and means responsive to the voltage of the particular magnitude on the first line and the voltage of the first logic level on the second line and the voltage having the second logic level from the clock signal means for providing for the bulk erasure of information from the programmable memory on the tag.

17. In combination for programming a tag which is adapted to be provided with an individual code and to be disposed on an object for use with a reader displaced from the object to obtain an identification of the object by the reader in accordance with the individual code on the tag, the tag having a programmable memory for storing the individual code and for obtaining the production of a sequence of signals representative of such individual code upon an interrogation by the reader, means for providing a first voltage having a first logic level to obtain an adjustment of first and second frequencies for the signals to be transmitted in the sequence by the tag to the reader and having a second logic level to obtain the programming of information into the programmable memory on the tag, means for providing a second voltage having a first logic level to obtain the programming of information into the programmable memory on the tag or an adjustment in the first and second frequencies for the signals to be transmitted in the sequence by the tag to the reader and having a second logic level preventing the programming of the information or the adjustment in the first and second frequencies of the signals to be transmitted in the sequence by the tag to the reader, means responsive to the first levels in the first and second voltages for adjusting the first and second frequencies of the signals to be transmitted in the sequence by the tag to the reader, and means responsive to the second level in the first voltage and the first level in the second voltage for programming information into the programmable memory in the tag.

18. In a combination as set forth in claim 17, a keyboard included in the combination and having a plurality of keys each operable to provide an indication of an individual character in an alphanumeric code, means for providing for the programming to be performed by the operation of the keys in the keyboard, means for providing for the programming to be performed from a source external to the keyboard, and means for providing for a selection of an individual one of the keyboard and the external source to provide the programming when the first voltage has the second logic level and the second voltage has the first logic level.

19. In a combination as set forth in claim 18, means for providing a third voltage having first and second logic levels, and means for providing for a bulk erasure of information in the programmable memory o the tag upon the occurrence of the first logic level in the first voltage and the second logic level in the second and third voltages.

20. In a combination as set forth in claim 18, the tag having pads for providing for the introduction of the first and second voltages to the tag, a housing having detent means cooperative with the tag and having pins cooperative with the pads on the tag for introducing the first and second voltages to the tag, the keyboard being disposed on the housing to program the programmable memory in the tag in accordance with the operation of the keys in the keyboard.

21. In a combination as set forth in claim 19, for providing for the introduction the tag having pads of the first, second and third voltages to the tag, a housing having detent means cooperative with the tag and having pins cooperative with the pads on the tag for individually introducing the first, second and third voltages to the tag, and a keyboard disposed on the housing and having a plurality of keys each depressible to provide for the recording of an individual alphanumeric indication in the programmable memory on the tag when the second and third voltages have the first logic level and the first voltage has the second logic level.

22. In combination for programming a tag which is adapted to be provided with an individual code and to be disposed on an object for use with a reader displaced from the object to obtain an identification of the object by the reader in accordance with the individual code on the tag, the tag having a programmable memory for storing the individual code and for obtaining the production at first and second frequencies of a sequence of signals representative of such individual code upon an interrogation by the reader, the tag having a plurality of pads, a housing for receiving the tag, detent means on the housing, the detent means having a plurality of pins which establish continuity with the pads on the tag when the housing receives the tag, means for introducing a first voltage through first ones of the pins in the plurality in the detent means on the housing and through first ones of the pads on the tag with a first logic level to provide for the programming of alphanumeric information in the programmable memory on the tag and with a second logic level, first means responsive to the first voltage of the first logic level on the first pads on the tag for providing for the programming of alphanumeric indications in the programmable memory on the tag, the tag having circuitry including a plurality of capacitors for providing for the adjustment, in accordance with the connection of the capacitors in the plurality in such circuitry, of the first and second frequencies for the signals to be transmitted by the tag to the reader in a sequential pattern identifying the individual code in the programmable memory on the tag, second means responsive to the production of the first voltage of the second logic level on the first pads on the tag for providing for the connection of the capacitors in the plurality in the circuitry to obtain the generation of the signals at the first and second frequencies by the tag to the reader, means for providing a second voltage having first and second logic levels, means responsive to the first voltage of the first logic level on the first pads on the tag and the second voltage of the first logic level on the second pads on the tag and the operation of the first means for selectively programming alphanumeric indications in the programmable memory on the tag and responsive to the first voltage of the second logic level in the first pads on the tag and the second voltage of the first logic level on the second pads on the tag for connecting individual on of the capacitors in the circuitry to obtain the transmission by the tag to the reader of the signals at the first and second frequencies, and means responsive to the second voltage of the second logic level for providing for the transmission by the tag to the reader of the signals at the first and second frequencies.

23. In a combination as set forth in claim 22, means for providing a third voltage having first and second logic levels the first means being operative to provide for the programming of the alphanumeric indications in the programmable memory on the tag upon the occurrence of the first logic level in the third voltage, the second means being operative to provide for the selection of individual ones of the capacitors upon the occurrence of the first logic level in the third voltage, and means responsive to the first and second voltages of the first logic level and the third voltage of the second logic level for providing for the bulk erasure of information in the programmable memory on the tag.

24. In a combination as set forth in claim 22, the programming means including a keyboard disposed on the housing and including a plurality of keys each operable to provide for the recording in the programmable memory on the tag of an individual one of a plurality of alphanumeric characters, means for providing a programming of alphanumeric information on the tag from a source external to the keyboard, and means for providing for the controlled selection at first times of the keyboard to record in the programmable memory the indications of the individual ones of the alphanumeric characters and for the controlled selection at second times of the source external to the keyboard to record in the programmable memory the indications of the individual ones of the alphanumeric characters.

25. In a combination as set forth in claim 24,
means on the keyboard for displaying the alphanumeric characters recorded in the programmable memory on the tag from the keyboard or the external source,
means on the keyboard for shifting the position in the programmable memory, as viewed on the display means, to any desired position, and
means responsive to the shifting of the position in the programmable memory, as viewed on the display means, to the desired position for substituting new indications of alphanumeric characters for the indications of the alphanumeric characters previously recorded in such positions.

26. In combination for programming a tag which is adapted to be provided with an individual code and to be disposed on an object for use with a reader displaced from the object to obtain an identification of the object by the reader in accordance with the individual code on the tag, the tag having a programmable memory for storing the individual code and for obtaining the production of a sequence of signals representative of such individual code upon an interrogation by the reader,
means for providing a first voltage having a first logic level to obtain a programming of individual ones of a plurality of alphanumeric characters into the programmable memory,
a keyboard having a plurality of keys each operable to provide for the recording of an individual one of the plurality of alphanumeric characters in the programmable memory on the tag,
means responsive to the first logic level in the first voltage and the operation of the individual keys in the keyboard for providing for the programming into the programmable memory of sequences of signals coding for the alphanumeric characters identified by such individual keys,
means for introducing to the tag a second voltage having an individual one of first, second and third logic levels wherein the first logic level provides a high impedance for retaining, in the programmable memory in the tag, the indications of the alphanumeric characters previously recorded in such programmable memory, a second logic level for providing for the introduction of the individual indications of the alphanumeric characters into the programmable memory in the tag and a third logic level for reading the indications of the alphanumeric characters from the programmable memory in the tag, and
means responsive to the second voltage of the third logic level for reading the indications of the alphanumeric indications from the programmable memory in the tag,
the programming means being operative to obtain the introduction of the individual indications of the alphanumeric introductions into the programmable memory in the tag upon the occurrence of the second voltage of the second logic level.

27. In a combination as set forth in claim 1,
means for providing a third voltage having first and second logic levels,
the programming means being operative to code the sequences of signals into the programmable memory upon the occurrence of the first logic level in the third voltage, and
means responsive to the first logic level in the first and second voltages and the second logic level in the third voltage for providing for a bulk erasure of the indications of the alphanumeric characters from the programmable memory in the tag.

28. In a combination as set forth in claim 26,
the tag being constructed to transmit to the reader signals at first and second frequencies in a sequential pattern individual to the alphanumeric information recorded in the programmable memory on the tag, the tag including a plurality of members energizable to adjust such first and second frequencies to particular values, and
means responsive to the second logic level in the first voltage and the second logic level in the second voltage for providing for the energizing of selected ones of the energizable members to obtain an adjustment in the first and second frequencies to the particular values in accordance with such energizings.

29. In a combination as set forth in claim 26,
a housing for holding the keyboard,
means for providing a third voltage having a first logic level producible during use of the tag in identifying the object, a second logic level producible during the programming of the indications of the alphanumeric characters into the programmable memory in the tag and a third logic level producible during the insertion of the tag on the housing, and
the programming means being operable to provide for the programming of the indications of the alphanumeric characters into the programmable memory in the tag when the voltage has the second logic level.

30. In a combination as set forth in claim 26,
means on the keyboard for providing for a selection of any desired position in the programmable memory,
means on the keyboard for providing for the erasure, at the selected position in the programmable memory, of information previously recorded at such selected position and for providing for the recording of new information in such selected position after such erasure, and
means on the keyboard for the providing for the display of the alphanumeric information recorded in the programmable memory in the tag to facilitate the erasure of the previously recorded information at the selected position in the programmable memory and for the recording of the new information in such selected position in the programmable memory.

* * * * *